United States Patent [19]

Scheer et al.

[11] Patent Number: 4,979,845

[45] Date of Patent: Dec. 25, 1990

[54] DEVICE FOR CONNECTION OF TWO MACHINE PARTS, IN PARTICULAR TWO TOOL PORTIONS OF MACHINE TOOLS

[75] Inventors: Gerhard Scheer, Löchgau; Werner Mündlein, Bietigheim-Bissingen, both of Fed. Rep. of Germany

[73] Assignee: Komet Stahlhalter- und Werkzeugfabrik Robert Breuning GmbH, Besigheim, Fed. Rep. of Germany

[21] Appl. No.: 272,210

[22] Filed: Nov. 16, 1988

[30] Foreign Application Priority Data

Nov. 24, 1987 [DE] Fed. Rep. of Germany ... 8715525[U]

[51] Int. Cl.$^5$ .............................................. F16D 1/00
[52] U.S. Cl. ..................................... 403/379; 403/362; 403/154
[58] Field of Search ................ 403/378, 379, 154, 362

[56] References Cited

U.S. PATENT DOCUMENTS

| 2,492,815 | 12/1949 | Robinson | 403/324 X |
| 2,693,815 | 11/1954 | Gould | 403/379 X |
| 3,258,283 | 6/1966 | Winberg et al. | 403/379 |
| 3,301,581 | 1/1967 | Winsberg | 403/379 |
| 3,479,072 | 11/1969 | Kosar | 403/362 X |
| 4,755,077 | 7/1988 | Eckle | 403/379 X |
| 4,756,639 | 7/1988 | Hoshino | 403/362 X |

FOREIGN PATENT DOCUMENTS 2094191 9/1987 United Kingdom .

Primary Examiner—Randolph A. Reese
Assistant Examiner—Carol I. Bordas
Attorney, Agent, or Firm—Flynn, Thiel, Boutell & Tanis

[57] ABSTRACT

A device for the connection of two tool portions has in one of the tool portions a cylindrical fitting pin (2) and an annular surface (3). The other tool portion (4) is provided with a mating bore (5) and an annular end face for receiving the fitting pin (2), and it has two diametrically opposed, radially extending internal threads (12) each with a screw (14, 13) provided with a ball (17) or a conical recess (15). In a transverse bore (6) of the fitting pin (2) is arranged a radially displaceable tightening bolt (7) which at one end has a conical recess (8) cooperating with the ball (17) of one screw (14), and at the other end has a ball (9) which cooperates with the recess (15) of the second screw (13). Both balls (9, 17) are rotatably mounted in a ball socket (10, 16) of the tightening bolt (7) or the screw(s) (14), respectively. On tightening one of the screws (13, 14) these act upon the tightening bolt (7) so as to press together the annular surface (3) and the end face (11).

5 Claims, 2 Drawing Sheets

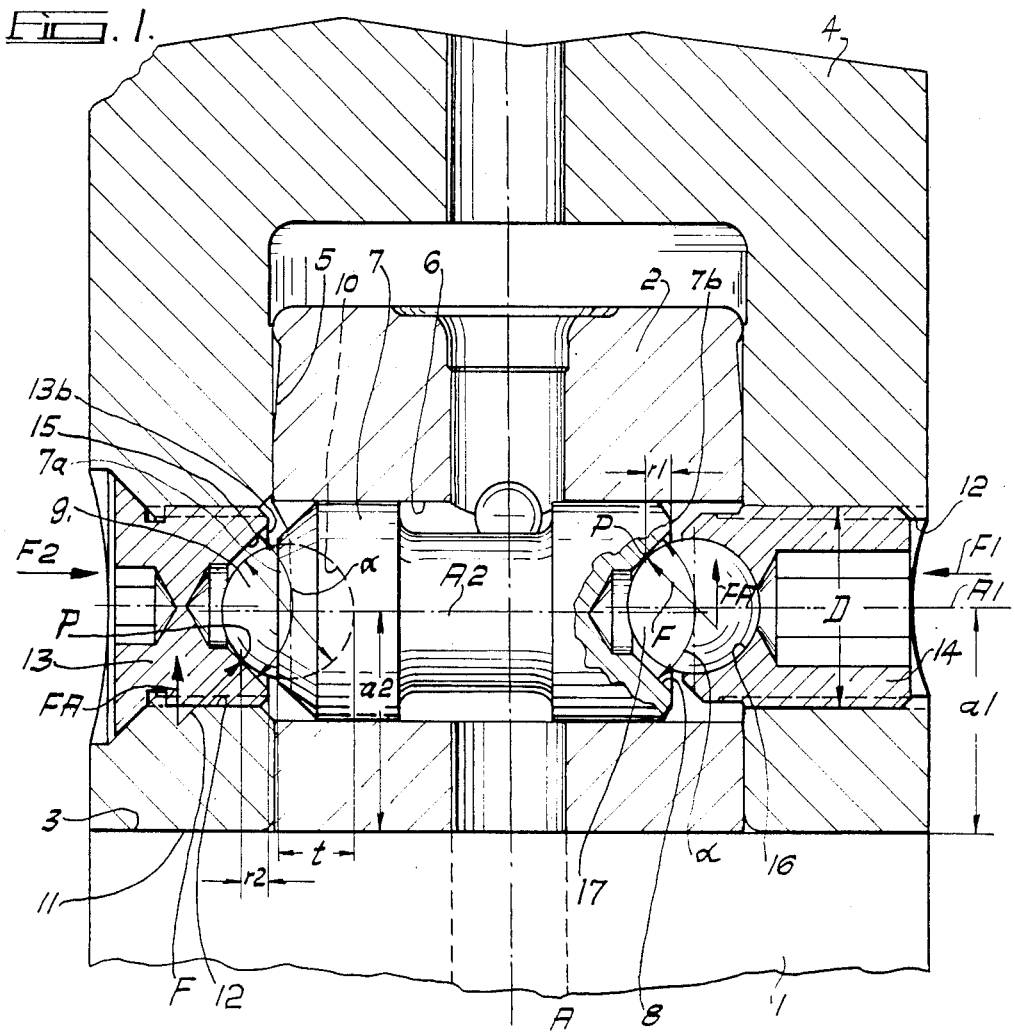
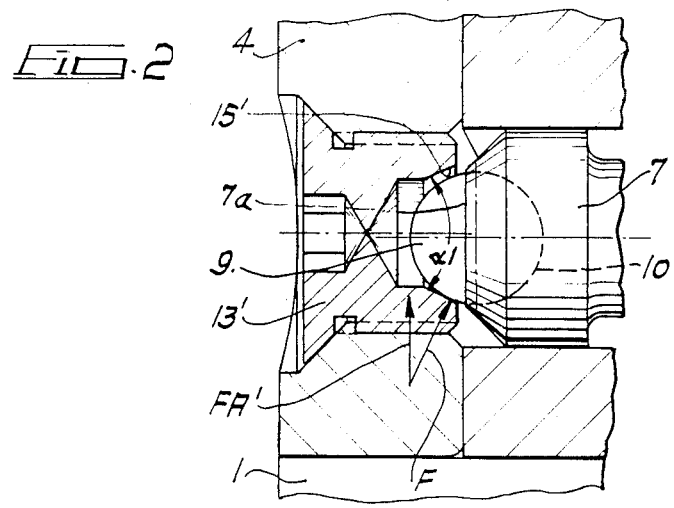

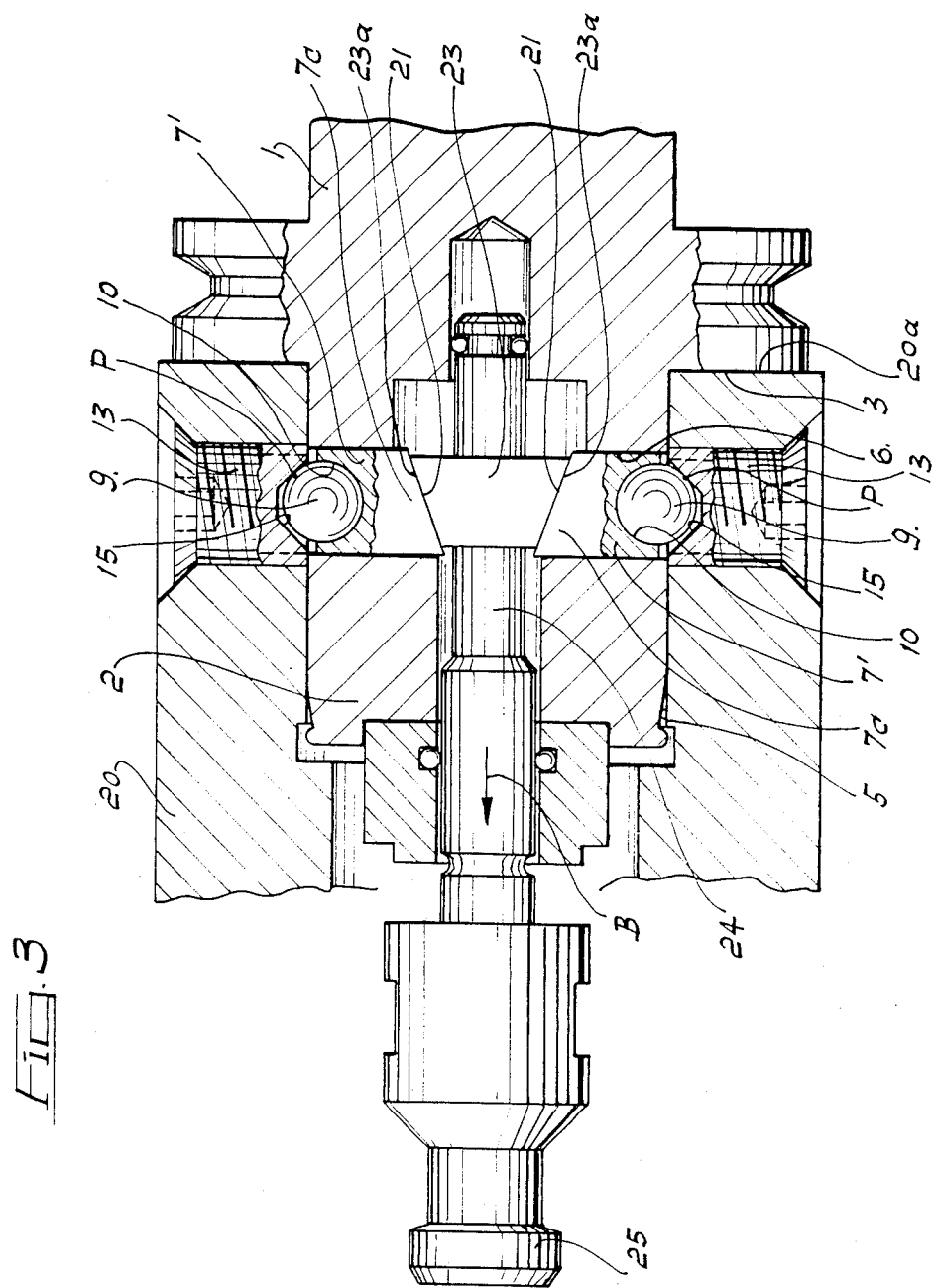

DEVICE FOR CONNECTION OF TWO MACHINE PARTS, IN PARTICULAR TWO TOOL PORTIONS OF MACHINE TOOLS

FIELD OF THE INVENTION

The invention concerns a device for the connection of two machine parts, in particular two tool portions of machine tools, with a cylindrical fitting pin which is provided on one tool portion and surrounded by an annular surface extending perpendicularly to the pin axis, and with a mating bore which is provided in the other tool portion for receiving the fitting pin and surrounded by an annular end face, wherein athe other tool portion comprises, in the region of the mating bore, two diametrically opposed, radially extending internal threads each with a screw which comprises a rotationally symmetrical extension tapering in the axial direction or a conical recess, wherein a tightening bolt which comprises at each of its two ends a recess or a tapering, rotationally symmetrical extension cooperating with the extension or the recess of the screw, is slidable in a transverse bore of the fitting pin extending perpendicularly to the fitting pin axis, and wherein the distance between the axis of the internal threads and the end face is slightly greater than the distance between the axis of the transverse bore and the annular surface.

BACKGROUND OF THE INVENTION

In such a device, known from GB-A-2 094 191, the tapering, rotationally symmetrical extensions of the screw and tightening bolt are of conical shape. In this case the tightening bolt can either be provided with conical extensions at its two ends, in which case both screws are then provided with conical recesses, or conversely both screws can be provided with conical extensions which engage in conical recesses of the tightening bolt, or the tightening bolt may at one end be provided with a conical extension and at the other end with a conical recess and accordingly one screw is provided with a conical recess and the other screw is provided with a conical extension. In any case, during tightening of one of the screws the tightening bolt is subjected to a tightening force which also has an axially directed component. The tightening force generates on the oppositely arranged screw a reaction force of the same magnitude, which also acts upon the tightening bolt with an axially directed force component. These two axially directed force components cause the annular surface and the end face to be pressed against each other with a specific tightening force. The strength of the tightening force depends essentially on the starting torque that is exerted upon the screw. In the case of fitting pins with smallish diameters and correspondingly small screws, the starting torque cannot be increased arbitrarily as this can lead to a breaking away of the screw threads. In the case of fitting pins with large diameters and correspondingly large screws, it has been shown that above a specific torque the tightening force no longer increases linearly with the starting torque, but can only be increased by an insignificant amount. However, the tightening force also depends on the stiffness of the connection and also the torque which is transmitted through the connection.

It is the aim of the invention, therefore, to provide a device for connecting two machine parts, in particular two tool portions of machine tools of the type mentioned at the beginning, in which, without increasing the starting torque of the screw, a substantial increase in the tightening force can be achieved by which the annular surface is pressed upon the end face.

SUMMARY OF THE INVENTION

According to the invention, this is achieved in that the extensions of the tightening bolt and of the screw(s) are constructed as balls which are each countersunk and rotatably mounted in a ball socket of the tightening bolt and of the screw(s), the depth (t) of which is slightly more than half the ball diameter, and cooperate with the conical recesses, wherein the ball diameter and the apical angles of the conical recesses have dimensions such that the balls and the conical recesses touch each at a point (P) of the application of force which is at an axial distance from the free ends of the tightening bolt and of the screw(s).

It has been shown that in this embodiment of the device, at a given starting torque of the screw, a substantially higher tightening force can be reached between the annular surface and the end face. Thus, for example, with a fitting pin diameter of 28 mm the achievable tightening force is increased from 1.5 t with the screw and tightening bolt having the existing conical extension to 2.5 t with the device according to the invention. The device according to the invention furthermore has the advantage that the screws and tightening bolts are subjected to very little wear and tear.

BRIEF DESCRIPTION OF THE DRAWINGS

The invention is now described in more detail with the aid of embodiment examples represented in the drawings. These show:

FIG. 1 an axial section of a first embodiment example,

FIG. 2 a part of an axial section of a second embodiment example,

FIG. 3 an axial section of a third embodiment example.

DETAILED DESCRIPTION

The invention is explained with the aid of two tool portions of machine tools. However, the device according to the invention can also be applied with the same advantage in any situation demanding the highest levels of the centering precision and high levels of tightening force. Thus, the invention could also be used for connecting a tool portion with a machine tool spindle, or for precisely mutually aligning and tightening other machine parts as required to connect them.

One of the tool portions 1 has a cylindrical fitting pin 2 which is surrounded by an annular surface 3 extending perpendicularly to the pin axis A. In the other tool portion 4 is provided a mating bore 5 for receiving the fitting pin. The fitting pin 2 has a transverse bore 6 in which a tightening bolt 7 is radially displaceable relative to the pin axis A. The tightening bolt 7 has a conical recess 8 at one of its ends. At its other end the tightening bolt carries a ball 9, which is rotatably housed in a ball socket 10.

The depth t of this ball socket 10 is slightly greater than half of the ball diameter d. The region of the end 7a of the tightening bolt 7 surrounding the ball 9 is beaded towards the ball, or drawn in, so that the ball 9 is retained in the tightening bolt 7 but able to rotate in the ball socket 10.

The mating bore 5 provided in the other tool portion 4 is concentrically surrounded by an annular end face 11 which is also arranged perpendicularly to the pin axis A. The other tool portion 4, in the region of the mating bore 5, has two diametrically opposed, radially extending internal screw threads 12, defining internally threaded bores adjoining the mating bore 5 and into which are screwed two screws 13, 14. One of the screws 14 in this case serves as the operating screw, while the other screw 13 is rigidly screwed into the tool portion 4 and forms an abutment. The screw 13 is provided with a conical recess 15. The apical angle or angle of opening $\alpha$ of this conical recess 15, as well as the conical recess 8 in the tightening bolt 7, may be between approximately 40 and 120 degrees. The smaller the apical angle, the greater is the attainable tightening force, and the greater, however, is also the adjusting path of the screw 14 in the direction of its axis A1.

The screw 14 also has a ball 17 which is arranged in a ball socket 16 in the same manner as the ball 9 is arranged in the ball socket 10.

As can be further seen from FIG. 1, the axes A1 of the screws 13, 14 are at a distance a1 from the end face 11 which is slightly greater than the distance a2 of the axis A2 of the transverse bore 6, or the tightening bolt 7 from the annular surface 3. In this way it is arranged that in the tightened position shown in FIG. 1 each of the balls 9, 17 are in single-sided arrangement with the associated conical recess 15 or 8. The point of contact or the contact field against which the balls 9 or 17 rest in the conical recesses 15 or 8, in the following is indicated by point P of aplication of force, because at these points the tightening forces are transmitted from the screws 13, 14 to the tightening bolts.

It is furthermore provided, according to the invention, that the points P of application of force are arranged at an axial distance r1 and r2 from the respective free ends 7b of the tightening bolt 7 and 13b of the screw 13. This prevents contact and force transfer along the edge between the respective conical recess 8 or 15 and the associated end surface 7b or 13b. This prevents unascertainable surface compressions and edge pressures from developing along the edges. The force transfer takes place where the tightening bolt 7 or the screw 13 already exhibits a relatively large wall strength. By adjusting the apical angle $\alpha$ of the conical recess 8, 15, its base diameter and the ball diameter d, it can be arranged that the points P of application of force each come to lie at the desired axial distance r1 or r2 from the free ends 7b or 13b.

It has proved to be advantageous if the balls 9, 17 are made from hard metal alloy.

The ball diameter d should be approximately ⅔ of the diameter D of the tightening screw 14.

On tightening the screw 14, first of all its ball 17 comes into position in the conical recess 8 of the tightening bolt 7 and displaces the tightening bolt 7 towards the left in the drawing until its ball 9 locates in the conical recess 15 of the screw 13. The mutual axial displacement of the two axes A1 and A2 therefore enables the above-mentioned single-sided arrangement of the balls 9, 17 in the associated conical recesses 15, 8. The radially acting tightening force F1 of the screw 14 produces in the screw 13 a reaction force F2 which is equal and opposite. The tightening force F1 and the reaction force F2 act on the points P of application of force to produce diagonally inwardly directed forces F whose direction extend perpendicularly to the generatrices of the conical recesses 8, 15. These forces F also have a force component FA each in the direction of the pin axis A.

As the force component FA is produced by each of the two screws 13, 14, the annular surface 3 and the end face 11 are pressed against each other with a tightening force V which is twice as large as the force component FA.

In order to increase the tightening force V still further, it is possible according to FIG. 2 to decrease, for example to 50 degrees, the apical angle 1 of the conical recess 15' of the screw 13', and accordingly also the apical angle of the conical recess of the tightening bolt.

The invention is not to be limited to the embodiment examples shown. For example, it could be conceivable to provide balls in both ends of the tightening bolt, in which case both screws would be equipped with conical recesses. Furthermore, if necessary balls could also be arranged at each of the two screws, in which case the tightening bolt would then be provided with conical recesses at both ends.

In the embodiment example shown in FIG. 3, the parts fulfilling the same function are designated by the same reference numerals as in the embodiment example shown in FIG. 1. The above description is therefore also analogous to the embodiment example shown in FIG. 2. In contrast to the embodiment example shown in FIG. 1, in which the tightening and loosening of the connection takes place radially from outside, in the embodiment example shown in FIG. 3 there is provided a central operating device. The tightening bolt in this case comprises of two identical tightening bolt parts 7', each of which carries at its outer end a ball 9 mounted in a ball socket 10 of the tightening bolt part 7'. The construction of the mounting of these balls 17 and their cooperation with the screws 13 corresponds to the embodiment example shown in FIG. 1 Both screws 13 in this case remain rigidly screwed into the machine tool spindle 20. They can be easily exchanged when worn.

Each of the two tightening bolt parts 7' has a diagonal surface 21 on its inner end 7c, the two diagonal surfaces being oppositely inclined with respect to each other. Between the inner ends 7c of the tightening bolt parts 7' there is arranged a tightening wedge 23 which is rigidly connected with the operating rod 24 and by means of this is adjustable in the direction of the fitting pin axis A. The operating rod may be connected to an advancing bolt 25. Gripping this advancing bolt 25 may be a collect chuck of a draw rod, not shown, which is axially displaceable in the machine tool spindle 20. When a traction force, acting in the direction B, is exerted in this manner upon the operating rod 24, the tightening bolts parts 7' are pressed radially outwards under the action of the wedge surfaces 23a of the tightening wedge 23. On contacting the balls 17 in the conical recesses 15, the annular surface 3 of the tool part 1 in turn is pressed against the end face 20a of the machine tool spindle 20.

We claim:

1. In a device for the connection of two machine parts, in particular two tool portions of machine tools, comprising: a cylindrical fitting pin provided on one said tool portion, said cylindrical fitting pin defining a pin axis extending therethrough, said one tool portion including means for defining an axially facing, radially extending annular surface extending perpendicularly to the pin axis, said cylindrical fitting pin projecting axially from said annular surface, means for defining a mating bore in the other said tool portion for receiving said fitting pin, said other tool portion including means for defining an annular end face surrounding said mating bore and abutting said annular surface when said fitting pin is received in said mating bore, means for defining in said other tool portion two diametrically opposed, radially extending, internally threaded bores adjoining said mating bore and having a common radially extending axis, each of said threaded bores threadedly receiving a screw which has at a radially inner end thereof adjacent said mating bore one of a rotationally symmetrical, radially tapering extension and means for defining a conical recess, means for defining in said fitting pin a transverse bore substantially radially aligned with said threaded bores when said fitting pin is received in said mating bore and extending perpendicularly to the fitting pin axis, said transverse bore having an axis which is substantially parallel to and slightly offset from said axis of said threaded bores, a tightening bolt slidably received in said transverse bore and having at each end thereof one of a radially tapering, rotationally symmetrical extension and means for defining a conical recess, each said one of said conical recess and said rotationally symmetrical extension of said bolt respectively receiving and being received in a corresponding said one of said rotationally symmetrical extension and said conical recess of a respective said screw, the distance between the axis of said threaded bores and said end face being slightly greater than the distance between the axis of said transverse bore and said annular surface, the improvement wherein said extensions of said tightening bolt and said screws are constructed as balls, wherein means is provided for defining, in at least one of said bolt and said screws, ball sockets slightly deeper than one half of the diameter of said balls for rotatably receiving said balls therein; said ball sockets having rims which are beaded inwardly toward said balls for rotatably retaining said balls in said ball sockets, said balls being captured radically between said bolt and said screws so as to simultaneously occupy said sockets and said conical recesses, and wherein said ball diameter and an apical angle of said conical recesses have dimensions such that said balls and said means defining said conical recesses touch at a point of application of force which is radially spaced from the respective said ends of said tightening bolt and said screws.

2. The device according to claim 1, wherein said balls are made from hard metal alloy.

3. The device according to claim 1, wherein the ball diameter amounts to approximately ⅔ of the diameter of one of said screws.

4. The device according to claim 1, wherein the apical angle of said conical recesses lies between approximately 40 and 120 degrees.

5. The device according to claim 1, wherein said tightening bolt includes two separate tightening bolt parts which have means defining oppositely inclined diagonal surfaces on their inner ends and facing each other, and a tightening wedge between said inner ends wedge which is adjustable in the direction of the fitting pin axis and has wedge surfaces which rest against said diagonal surfaces.

* * * * *

UNITED STATES PATENT AND TRADEMARK OFFICE
CERTIFICATE OF CORRECTION

PATENT NO. : 4 979 845

DATED : December 25, 1990

INVENTOR(S) : Gerhard SCHEER et al.

It is certified that error appears in the above-identified patent and that said Letters Patent is hereby corrected as shown below:

Column 6, line 6; change "radically" to ---radially---.

Column 6, line 28; delete "wedge".

Signed and Sealed this

Twenty-third Day of April, 1991

Attest:

HARRY F. MANBECK, JR.

*Attesting Officer*     *Commissioner of Patents and Trademarks*